(12) United States Patent
Fong et al.

(10) Patent No.: US 10,445,165 B2
(45) Date of Patent: Oct. 15, 2019

(54) INACTIVE APPLICATION RESTARTING

(71) Applicant: Hewlett-Packard Development Company, L.P., Houston, TX (US)

(72) Inventors: Chee Keat Fong, Cypress, TX (US); Phuc Dinh, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 103 days.

(21) Appl. No.: 15/681,600

(22) Filed: Aug. 21, 2017

(65) Prior Publication Data

US 2019/0056986 A1    Feb. 21, 2019

(51) Int. Cl.
| | |
|---|---|
| *G06F 11/00* | (2006.01) |
| *G06F 11/07* | (2006.01) |
| *H04L 12/26* | (2006.01) |
| *G06F 11/14* | (2006.01) |
| *H04W 68/00* | (2009.01) |
| *H04W 4/00* | (2018.01) |
| *G06F 11/36* | (2006.01) |

(52) U.S. Cl.
CPC ...... *G06F 11/0742* (2013.01); *G06F 11/1402* (2013.01); *H04L 43/10* (2013.01); *H04W 4/00* (2013.01); *H04W 68/005* (2013.01); *G06F 11/0757* (2013.01); *G06F 11/3612* (2013.01)

(58) Field of Classification Search
CPC .. H04L 67/26; G06F 11/0703; G06F 11/0742; G06F 11/0793; G06F 11/1402; G06F 11/1415; G06F 11/1438; G06F 11/1441; G06F 11/36–3668; H04W 4/00–90
See application file for complete search history.

(56) References Cited

U.S. PATENT DOCUMENTS

| | | | |
|---|---|---|---|
| 8,082,292 B2 | 12/2011 | Karmakar et al. | |
| 8,407,776 B2* | 3/2013 | Somani | H04L 63/0884 726/9 |
| 9,369,830 B2 | 6/2016 | Nelson et al. | |
| 9,392,393 B2 | 7/2016 | Wood et al. | |
| 2014/0222757 A1* | 8/2014 | Huang | G06F 16/273 707/613 |
| 2014/0324972 A1* | 10/2014 | Zhang | H04L 67/26 709/204 |
| 2014/0362768 A1* | 12/2014 | Wood | H04L 67/322 370/328 |
| 2015/0282117 A1 | 10/2015 | Serna Pozuelo et al. | |

(Continued)

OTHER PUBLICATIONS

Apple~App Programming Guide for IOS; 2017, https://developer.apple.com/library/content/~14 pages.

(Continued)

*Primary Examiner* — Michael Maskulinski
(74) *Attorney, Agent, or Firm* — HP Patent Department (57) ABSTRACT

Examples associated with inactive application restarting are described. One example method includes establishing a connection between a host device and a remote device. The connection is used for communications between the host device and an application on the remote device. An inactive state of the application is detected on the remote device. A message is transmitted to the remote device to notify a user to restart the application. A user interaction with the message restarts the application.

15 Claims, 5 Drawing Sheets

(56) References Cited

U.S. PATENT DOCUMENTS

2015/0358272 A1* 12/2015 Wen .................... H04L 67/025
                                                    709/206
2017/0063845 A1*  3/2017 Sojoodi ................. H04L 67/16
2018/0321970 A1* 11/2018 Cortes .................. G06F 9/4843

OTHER PUBLICATIONS

Webpage~How to Handle Remote Notification with Background Mode Enabled: Aug. 7, 2015, 6 pages~http://samwize.com/2015/08/07/.
Webpage~Support for Applications Running in Background in iOS, Sep. 12, 2013, http://blogs.innovation.com/~6 pages.

* cited by examiner

INACTIVE APPLICATION RESTARTING

BACKGROUND

Mobile devices are used for a variety of purposes, including communication, entertainment, productivity, security, and so forth. These tasks are often implemented by applications that are native and/or downloadable to the mobile devices. To ensure that an active application has sufficient resources available to operate, some mobile devices deactivate and/or deload data associated with applications the user is not currently actively using.

BRIEF DESCRIPTION OF THE DRAWINGS

The present application may be more fully appreciated in connection with the following detailed description taken in conjunction with the accompanying drawings.

DETAILED DESCRIPTION

Systems, methods, and equivalents associated with inactive application restarting are described. As discussed above, when a mobile device has used up its memory, it may turn off and unload applications to free up resources for an application that the user is currently actively using. Certain applications, such as applications that operate a Bluetooth low energy service that other devices connect to may be have priority for being allowed to run in the background. However, in some circumstances, even these applications may be turned off by the mobile device. Consequently, when a user expects a service to work, but the background application has been disabled, the user may be unsure as to why the service is not working. Thus, when, for example, a computer providing a service that relies on communication with an application detects that the application has been disabled, the computer may transmit a message to the mobile device to instruct the user to restart the application so that the user can continue benefiting from the service provided by the device. In some examples, the message may be a push notification that, when interacted with by the user, automatically restarts the application.

Figure 1:
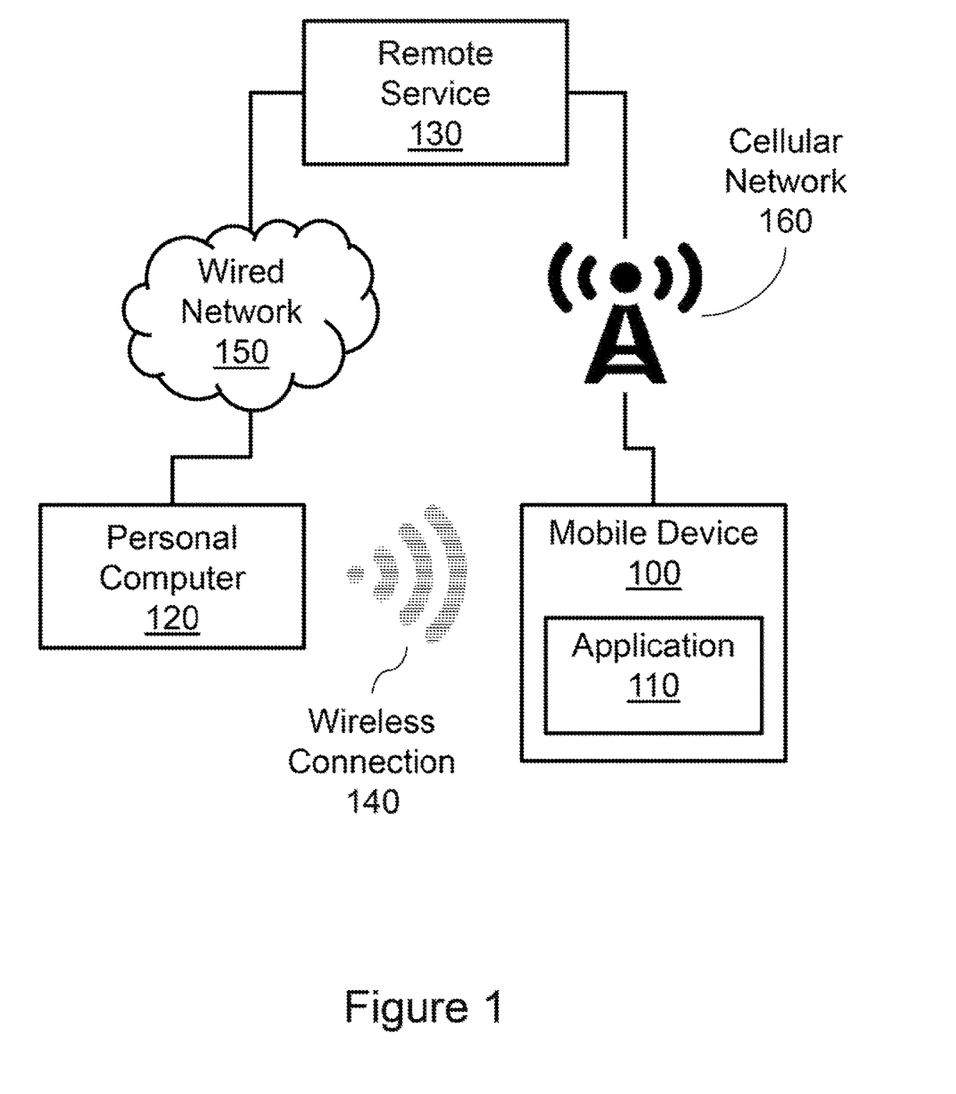
FIG. 1 illustrates example devices associated with inactive application restarting.

FIG. 1 illustrates example devices associated with inactive application restarting. It should be appreciated that the items depicted in FIG. 1 are illustrative examples, and many different systems, devices, and so forth, may operate in accordance with various examples.

FIG. 1 illustrates example devices 100 associated with inactive application restarting. For example, FIG. 1 includes a mobile device 100. Mobile device 100 may be, for example, a cell phone, a tablet, a wearable, and so forth that runs various applications including application 110. In various examples, application 110 may be provide a services to a user of mobile device 100 both when the application is operating in the foreground or as a background process for mobile device 100. As used herein, applications may be referred to as being in a variety of states including an active state, an inactive state, and a background state. An active application is considered to be an application on which a mobile device and/or a user is currently and/or primarily focusing resources and attention. Some mobile devices may limit themselves to having one active application at a time. An application in a background state is an application that continues to use system resources of a mobile device operating the background application. These recourses may include, for example, memory, processing resources, network bandwidth, and so forth. Priority for these resources may be given to an active application and background applications may be allowed to use resources that are underutilized by the active application. An inactive state is an application that is not actively using system resources of a mobile device beyond the storage space associated with instructions and/or data associated with the application.

In conjunction with other devices (e.g., personal computer 120, remote service 130) and applications (e.g., application 110), mobile device 100 may provide various services to, and perform various functions on behalf of users of mobile device 100. These functions and services may relate to games, security, productivity, communications, and so forth. The functions may be provided both via applications that are active, as well as by applications are operating in the background. For example, a user may be sending an email using an active application such as a web browser, while listening to music using an application operating in a background state. If the user does not use one of these applications for an extended period of time, mobile device 100 may disable the application, unloading data and instructions associated with the application from memory until the user seeks to use the application, at which point mobile device 100 may restart the application to return it to an active or background state. In some examples, that the application was in an inactive state may be hidden from the user if the process of unloading the application stores certain state information regarding the application so that the application can be restored to that state when it is restarted.

Generally, mobile device 100 may prioritize turning off applications that do not provide a background service to a user when attempting to free up resources for active applications. This may ensure that the user may benefit from the background applications even if the user has not used an application for an extended period of time. However, eventually, mobile device 100 may have reason to turn off additional applications. This may be because, for example, mobile device 100 is loading an application that consumes greater resources than are available, because mobile device 100 has be restarted (e.g., to apply an update), and so forth. In other examples, a user may turn off applications, including those providing background services, for a variety of reasons.

When an application is deactivated that provides functionality by communicating with other devices, a user may be confused when these other devices do not respond as expected due to the inability of the other devices to communicate with the inactive application. For example, a security application 110 installed on mobile device 100 may communicate with personal computer 120 to allow personal computer 120 to provide a user of mobile device 100 with access to certain resources of personal computer 120 as long as mobile device 100 is within a certain physical proximity. However, if the application is disabled, certain authenticating information may not be transmitted over a wireless connection 140 (e.g., Bluetooth) from mobile device 100 to personal computer 120 to facilitate personal computer 120 unlocking.

Consequently, in some examples, personal computer 120 may be able to detect when application 100 is in an inactive state by detecting the presence of mobile device 100 but not receiving a response from application 110 itself. Thus, personal computer 120 may have a message delivered to mobile device 100 to instruct a user of mobile device 100 to reinitiate application 110. The message may be, for example, a push notification. The message may also restart application 110 when the user interacts with the application. This may allow the user to quickly restart application 110 by interacting directly with the message. However, if the user does not interact with the message directly, the user may be able to manually activate the application by navigating to an icon on the mobile device designed to launch the application.

To transmit the message, personal computer may rely on a remote service 130 to transmit the message to mobile device 100. The remote service 130 may be provided by a manufacturer or mobile service provider for mobile device 100. Thus, personal computer 120 may use an application programming interface to send a message to remote service 130 via, for example, a wired network 150. In this example, wired network 150 may be the Internet, and personal computer 120 may connect to wired network 150 via a variety of techniques (e.g., Wifi, Ethernet). The remote service 130 may then activate a cellular network 160 to ensure the message reaches mobile device 108.

In other examples, the service provided by application 110 may interact directly with a remote service 130. This may be achieved by, for example, application 110 transmitting periodic messages to remote service 130 (e.g., via cellular network 160). If remote service 130 does not receive one of these periodic messages after a known period of time, remote service 130 may transmit a message to mobile device 130 asking the user of mobile device 100 to restart application 110. This transmission may be performed directly by remote service 130, by an intermediary service (e.g., a push notification service), and so forth.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
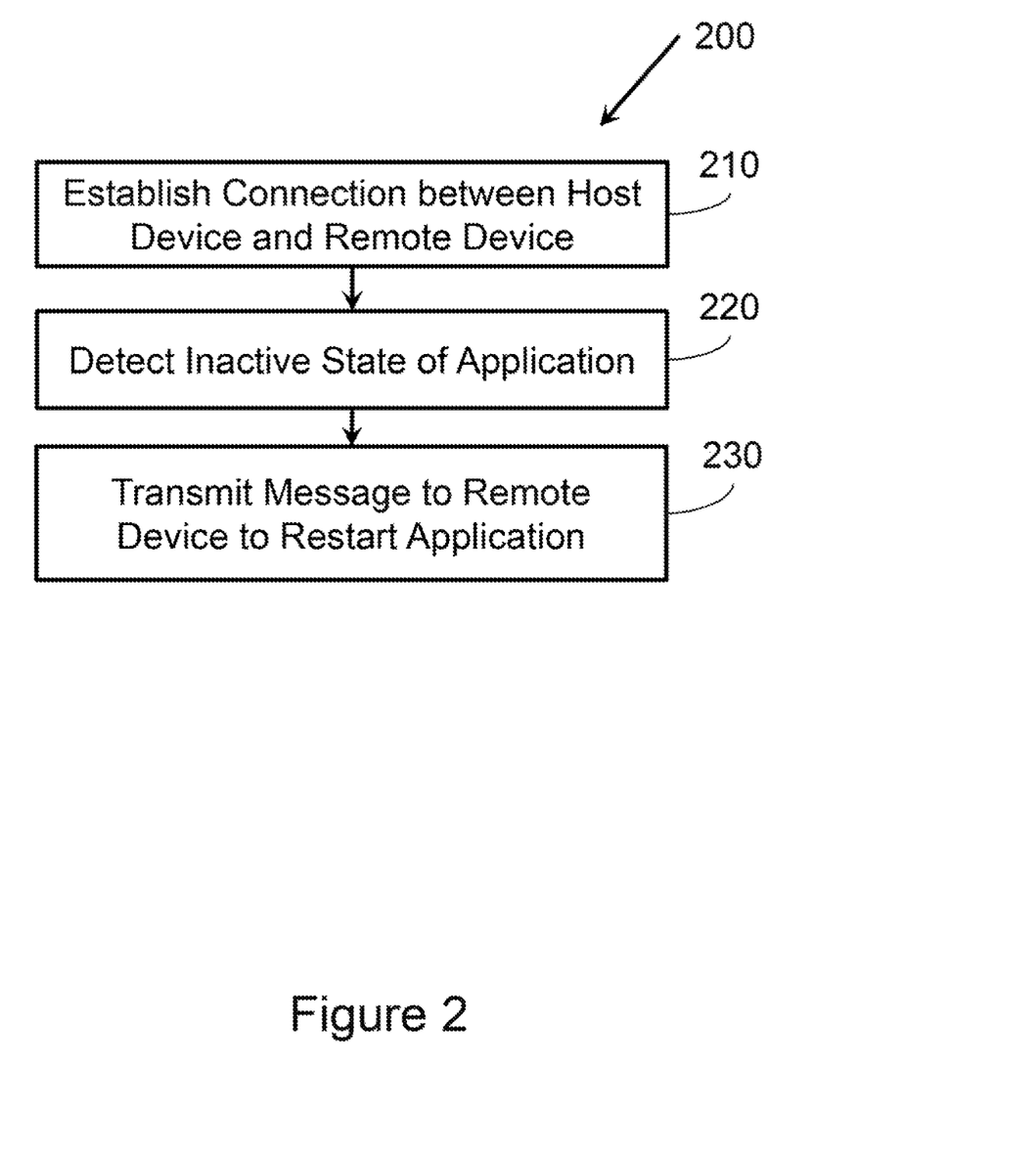
FIG. 2 illustrates a flowchart of example operations associated with inactive application restarting.

FIG. 2 illustrates an example method 200. Method 200 may be embodied on a non-transitory processor-readable medium storing processor-executable instructions. The instructions, when executed by a processor, may cause the processor to perform method 200. In other examples, method 200 may exist within logic gates and/or RAM of an application specific integrated circuit (ASIC).

Method 200 may perform various tasks associated with inactive application restarting. Method 200 may include actions performed by a host device. The host device may be, for example, a personal computer, a server, and so forth. Method 200 includes establishing a connection between the host device and a remote device at 210. The remote device may be, for example, a mobile device such as a cell phone, a tablet, a wearable, and so forth. The connection may be used for communications between the host device and an application on the remote device. The connection may be, for example, a Bluetooth connection. In one example, the application may allow the host device to detect a physical presence of the remote device. While the host device detects the physical presence of the remote device, the host device may grant access to a feature of the host device to the user. The feature may include, for example, data, an application, access to the host device, and so forth.

Method 200 also includes detecting an inactive state of the application on the remote device at 220. In one example, the inactive state of the application may include attempting to communicate with the application on the remote device using the connection established at action 210.

Method 200 also includes transmitting a message to the remote device at 230. The message may be, for example, a push notification. The message may notify the user to restart the application. Additionally, when the user interacts with the message, the message may restart the application.

In another example, the host device may be a server, and the connection may be a network connection. In this example, the server may detect the inactive state of the application when the server fails to receive a periodic communication from the application over the network connection. By way of illustration, the application may be a mobile exercise application that tracks activity levels of a user of the remote device and transmits activity level data to the server at periodic intervals. Thus, the server may transmit the message to the mobile device to restart the application when the server has not received a predefined number of updates from the mobile device regarding user activity levels.

Figure 3:
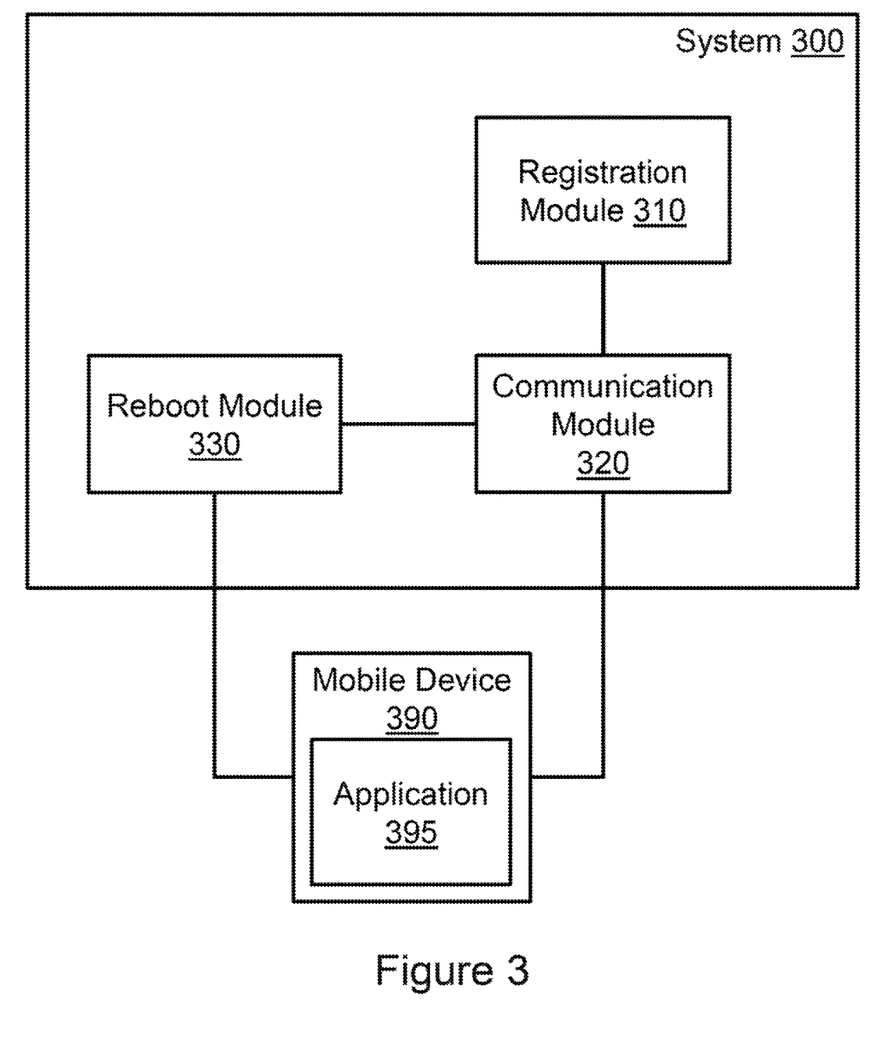
FIG. 3 illustrates an example system associated with inactive application restarting.

FIG. 3 illustrates an example system 300 associated with inactive application restarting. System 300 includes a registration module 310. Registration module 310 may create a profile associated with a mobile device 390. The profile may associate mobile device with an application 395 on mobile device 390. The profile may facilitate communication between system 300 and application 395. In one example, registration module 310 may be a Bluetooth pairing module. Consequently, other components of system 300 may communicate with mobile device 390 using Bluetooth technologies (e.g., Bluetooth low energy).

System 300 also includes a communication module 320. Communication module 320 may periodically communicate with mobile device 390. Communicating with mobile device 390 may indicate a status of application 395.

System 300 also includes a reboot module 330. Reboot module 330 may transmit a message to a user of mobile device 390. The message may be transmitted when the status of application 395 indicates application 395 is inactive. The message may ask that the user restart application 395 on mobile device 390. Further, the message, when interacted with by the user on mobile device 390, may control mobile device 390 to restart application 395. In some examples, the message may be, a push notification that causes mobile device 390 to make noise, vibrate, and so forth, when mobile device 390 receives the push notification.

In some examples, system 300 may include a verification module (not shown). The verification module may verify a presence of an authenticated user of system 300 when communication module 320 detects that mobile device 390 is within a predefined physical proximity to system 300 and that application 395 is active and provides a credential to communication module 320.

Figure 4:
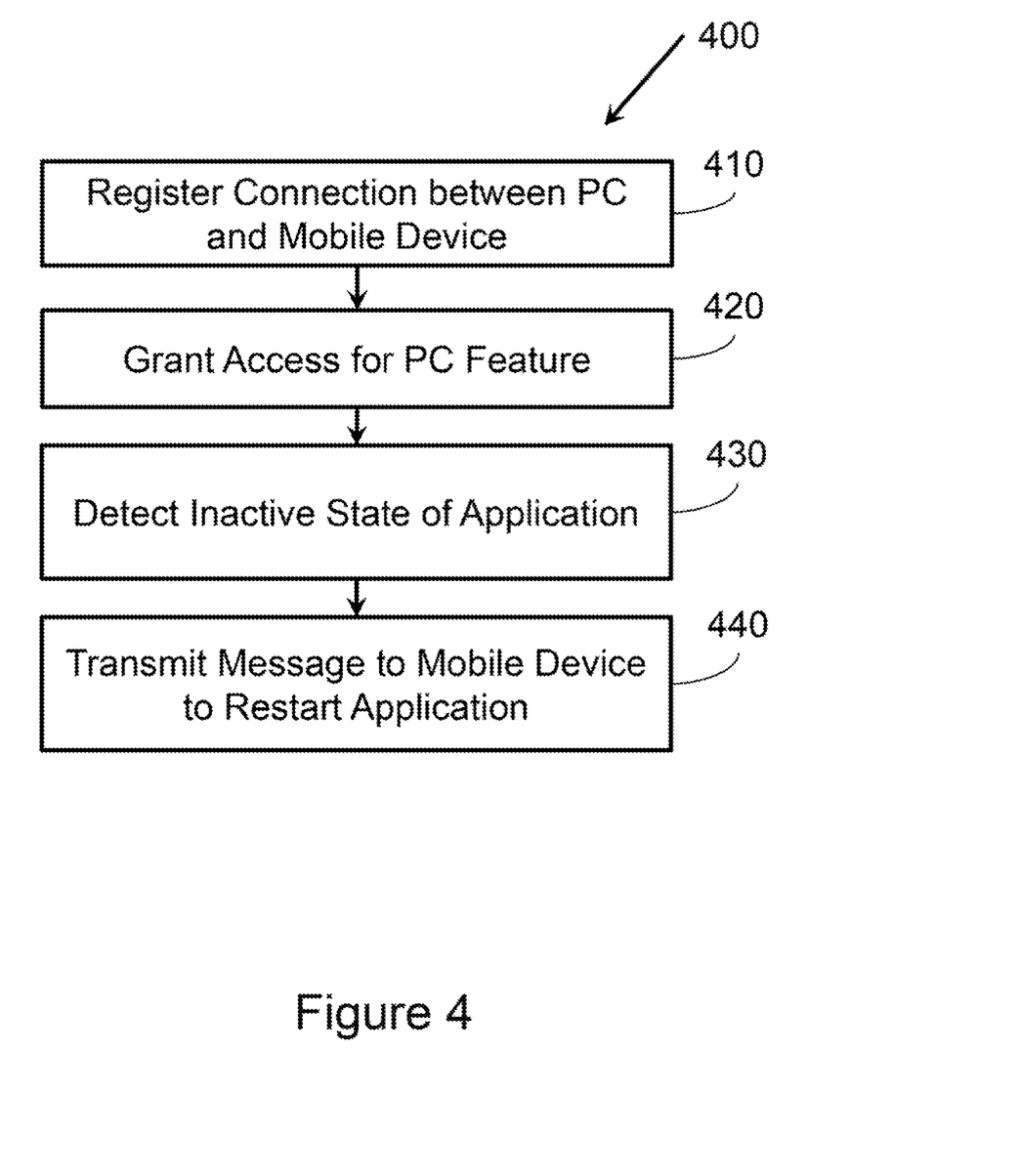
FIG. 4 illustrates another flowchart of example operations associated with inactive application restarting.

FIG. 4 illustrates another example method 400 associated with inactive application restarting. Various actions of method 400 may be performed by, for example, a personal computer. Method 400 includes registering a connection between the personal computer and a mobile device at 410. The connection may be used for communications between the personal computer and an application on the mobile device. The connection may be, for example, a Bluetooth low energy pairing between the personal computer and the mobile device.

Method 400 also includes granting access to a feature of the personal computer at 420. Access to the feature may be granted when the personal computer detects the mobile device is within a predefined distance of the personal computer and when the personal computer receives an authenticating signal from the application. In various examples, the personal computer may detect the presence of the mobile device as well as receive the authenticating signal using the connection established at action 410.

Method 400 also includes detecting an inactive state of the application on the mobile device at 430. This may occur when, for example, the personal computer detects the presence of the mobile device using the connection established at 410, but does not receive a response from a query directed to the application.

When the inactive state is detected, method 400 includes transmitting a message to the mobile device at 440. The message may notify a user of the mobile device to restart the application. Additionally, when the user interacts with the message, the message may cause the application to restart. The message may be, for example, a push notification.

Figure 5:
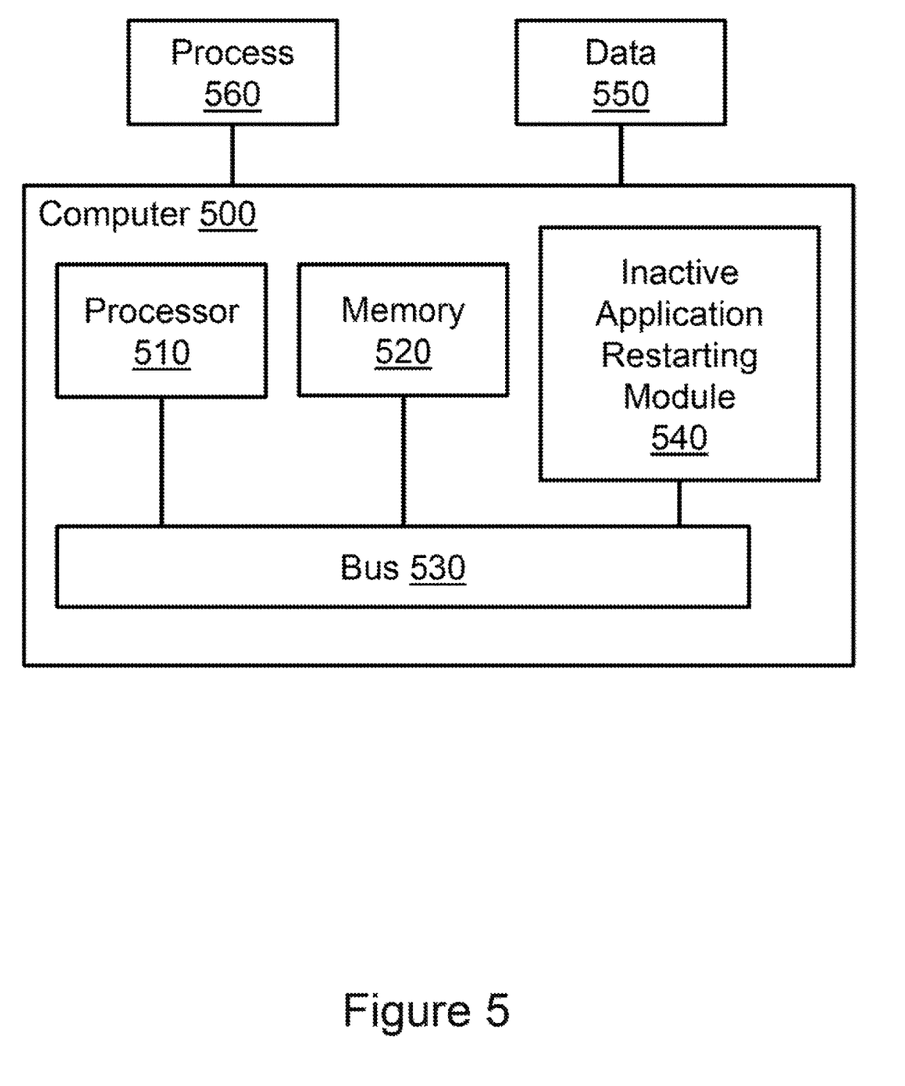
FIG. 5 illustrates an example computing device in which example systems, and methods, and equivalents, may operate.

FIG. 5 illustrates an example computing device in which example systems and methods, and equivalents, may operate. The example computing device may be a computer 500 that includes a processor 510 and a memory 520 connected by a bus 530. Computer 500 includes an inactive application restarting module 540. Inactive application restarting module 540 may perform, alone or in combination, various functions described above with reference to the example systems, methods, and so forth. In different examples, inactive application restarting module 540 may be implemented as a non-transitory computer-readable medium storing processor-executable instructions, in hardware, software, firmware, an application specific integrated circuit, and/or combinations thereof.

The instructions may also be presented to computer 500 as data 550 and/or process 560 that are temporarily stored in memory 520 and then executed by processor 510. The processor 510 may be a variety of processors including dual microprocessor and other multi-processor architectures. Memory 520 may include non-volatile memory (e.g., read-only memory) and/or volatile memory (e.g., random access memory). Memory 520 may also be, for example, a magnetic disk drive, a solid state disk drive, a floppy disk drive, a tape drive, a flash memory card, an optical disk, and so on. Thus, memory 520 may store process 560 and/or data 550. Computer 500 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method, comprising:
establishing, by a host device, a connection between the host device and a remote device, where the connection is used for communications between the host device and an application on the remote device;
detecting an inactive state of the application on the remote device; and
transmitting a message to the remote device to notify a user to restart the application, where the message will restart the application when the user interacts with the message.

2. The method of claim 1, where the host device is a personal computer, where the remote device is a mobile device.

3. The method of claim 1, where the application allows the host device to detect a physical presence of the remote device to cause the host device to grant access to a feature of the host device to the user when the physical presence of the remote device is detected.

4. The method of claim 1, where connection is a Bluetooth connection, and where detecting the inactive state of the application includes attempting to communicate with the application on the remote device using the Bluetooth connection.

5. The method of claim 1, where the message is a push notification.

6. The method of claim 1, where the host device is a server, where the remote device is a mobile device, where the connection is a network connection, and where the server detects the inactive state of the application when the server fails to receive a periodic communication from the application over the network connection.

7. The method of claim 6, where the application is a mobile exercise application that tracks activity levels of a user of the mobile device and transmits activity level data to the server at periodic intervals, and where the server transmits the message to the mobile device when the server has not received a predefined number of updates from the mobile device regarding user activity levels.

8. A system, comprising:
a registration module to create a profile associated with a mobile device, where the profile associates the mobile device with an application on the mobile device, and where the profile facilitates communication between the system and the application;
a communication module to periodically communicate with the mobile device, and where communicating with the mobile device indicates a status of the application; and
a reboot module to transmit, when the status of the application indicates the application is inactive, a message to a user of the mobile device to restart the application, where the message, when interacted with by the user, controls the mobile device to restart the application.

9. The system of claim 8, where the registration module is a Bluetooth pairing module, and where the communication module is a Bluetooth low energy communication module.

10. The system of claim 8, where the message is a push notification.

11. The system of claim 10, where the push notification causes the mobile device to at least one of, make noise and vibrate.

12. The system of claim 8, comprising a verification module to verify a presence of an authenticated user of the system when the communication module detects the mobile device is within a predefined physical proximity to the system and the application is active and provides a credential to the communication module.

13. A non-transitory computer-readable medium storing processor executable instructions that, when executed, control a processor to:

register, by a personal computer, a connection between the personal computer and a mobile device, where the connection is used for communications between the personal computer and an application on the mobile device;

grant access to a feature of the personal computer when the personal computer detects the mobile device is within a predefined distance of the personal computer and when the personal computer receives an authenticating signal from the application;

detect an inactive state of the application on the mobile device; and transmit a message to the mobile device to notify a user of the mobile device to restart the application, where the message will restart the application when the user interacts with the message.

14. The non-transitory computer-readable medium of claim 13, where the connection is a Bluetooth low energy pairing between the personal computer and the mobile device.

15. The non-transitory computer-readable medium of claim 13, where the message is a push notification.

* * * * *